(12) United States Patent
Pao

(10) Patent No.: US 11,226,064 B2
(45) Date of Patent: Jan. 18, 2022

(54) FOLDABLE DISPLAY STAND

(71) Applicant: ASIA LINK CO., LTD., Taichung (TW)

(72) Inventor: Chih-Ting Pao, Taichung (TW)

(73) Assignee: ASIA LINK CO., LTD., Taichung (TW)

( * ) Notice: Subject to any disclaimer, the term of this patent is extended or adjusted under 35 U.S.C. 154(b) by 0 days.

(21) Appl. No.: 17/198,350

(22) Filed: Mar. 11, 2021

(65) Prior Publication Data

US 2021/0285595 A1   Sep. 16, 2021

(30) Foreign Application Priority Data

Mar. 13, 2020 (TW) .................................. 109108433

(51) Int. Cl.
*F16M 11/10* (2006.01)
*F16M 11/34* (2006.01)

(52) U.S. Cl.
CPC ............. *F16M 11/10* (2013.01); *F16M 11/34* (2013.01)

(58) Field of Classification Search
CPC ................................ F16M 11/10; F16M 11/34
USPC ............ 40/606.16; 248/125.8, 434, 166, 167
See application file for complete search history.

(56) References Cited

U.S. PATENT DOCUMENTS

| | | | | |
|---|---|---|---|---|
| 1,565,636 A * | 12/1925 | Goetz | ..................... | A47C 9/105 297/461 |
| 1,611,432 A * | 12/1926 | Gladstone | ................ | G10G 5/00 248/371 |
| 2,891,832 A * | 6/1959 | Greenwald | ............ | A47B 3/087 248/434 |
| 4,848,712 A * | 7/1989 | Russell | ..................... | A47C 9/10 248/155.2 |
| 5,046,203 A * | 9/1991 | de Cuadros | ................ | A45F 3/24 5/128 |
| 6,305,653 B1 * | 10/2001 | Oldham | .................. | F16M 11/04 248/125.8 |
| 7,530,543 B1 * | 5/2009 | Kremzar | ................ | A47B 97/02 160/24 |
| 8,136,786 B2 * | 3/2012 | Kepes | ..................... | A47B 97/08 248/465.1 |
| 8,864,098 B2 * | 10/2014 | Bottazzi | ............. | E04F 21/1805 248/688 |
| 2007/0102598 A1 * | 5/2007 | Nichols | ..................... | B25H 5/00 248/125.8 |
| 2010/0064739 A1 * | 3/2010 | Lu | .......................... | F16M 11/34 70/57 |

(Continued)

FOREIGN PATENT DOCUMENTS

CN   204223178 U  *  3/2015
JP   2008193989 A  *  8/2008

*Primary Examiner* — Eret C McNichols
(74) *Attorney, Agent, or Firm* — Burris Law, PLLC

(57) ABSTRACT

A foldable display stand includes a leg unit and two support arm assemblies. The leg unit includes two leg tubes. Each of the support arm assemblies includes a support arm, and is convertible among a storage state where the support arm is substantially retracted into a respective one of the leg tubes, a projecting state where the support arm substantially projects out of the respective leg tube and where the support arm extends along an extending axis of the respective leg tube, and a display state where the support arm extends in a direction transverse to the direction of the extending axis of the respective leg tube.

7 Claims, 17 Drawing Sheets

(56) References Cited

U.S. PATENT DOCUMENTS

2010/0328962 A1* 12/2010 Liu .................. F21V 21/06
362/384

* cited by examiner

FOLDABLE DISPLAY STAND

CROSS-REFERENCE TO RELATED APPLICATION

This application claims priority to Taiwanese Invention Patent Application No. 109108433, filed on Mar. 13, 2020.

FIELD

The disclosure relates to a display stand, and more particularly to a foldable display stand.

BACKGROUND

A conventional foldable display stand (see FIG. 17), such as a display easel, includes a base portion 2, a supporting rod 3 fixedly disposed on the base portion 2, two arms 4, and two holders 5 respectively disposed on the arms 4. Each of the arms 4 has an end 6 pivotally connected to the supporting rod 3, and a free end 7. When the conventional foldable display stand is used to display a painting, the arms 4 extend in a direction perpendicular to the supporting rod 3, and the holders 5 are used to clamp the painting. When each of the arms 4 is pivoted to a position where the free end 7 thereof abuts against the supporting rod 3 and where the arm 4 extends in a direction substantially parallel to the supporting rod 3, the conventional foldable display stand is folded for storage.

However, when the conventional foldable display stand is folded, the arms 4 are positioned externally of the supporting rod 3 and prone to swinging, which may cause a user handling the conventional foldable display stand to have their fingers caught between the arms 4 and the supporting rod 3, thereby injuring the user. Therefore the conventional foldable display stand lacks safety. In addition, the dangling arms 4 are less desirable from the perspective of portability.

SUMMARY

Therefore, an object of the disclosure is to provide a foldable display stand that can alleviate at least one of the drawbacks of the prior art.

According to the disclosure, the foldable display stand includes a base, a leg unit, two restraining members and two support arm assemblies. The leg unit includes two leg tubes. Each of the leg tubes has a top part that is connected to the base. The restraining members are respectively disposed on the top parts of the leg tubes. The support arm assemblies are respectively mounted to the leg tubes. Each of the support arm assemblies includes a connecting member and a support arm. The connecting member of each of the support arm assemblies is movable along the respective one of the leg tubes, and is blocked by one of the restraining members that is disposed on the respective one of the leg tubes so as to be prevented from being separated from the respective one of the leg tubes during upward movement thereof relative to the respective one of said leg tubes. The support arm of each of the support arm assemblies has a connecting section that is pivotally connected to the connecting member of the support arm assembly, and a free section that extends from the connecting section and away from the connecting member of the support arm assembly. Each of the support arm assemblies is convertible among a storage state where the support arm of the support arm assembly is substantially retracted into the respective one of the leg tubes, a projecting state where the support arm substantially projects out of the respective one of the leg tubes and where the support arm extends along an extending axis of the respective one of the leg tubes, and a display state where the support arm extends in a direction transverse to the direction of the extending axis of the respective one of the leg tubes.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
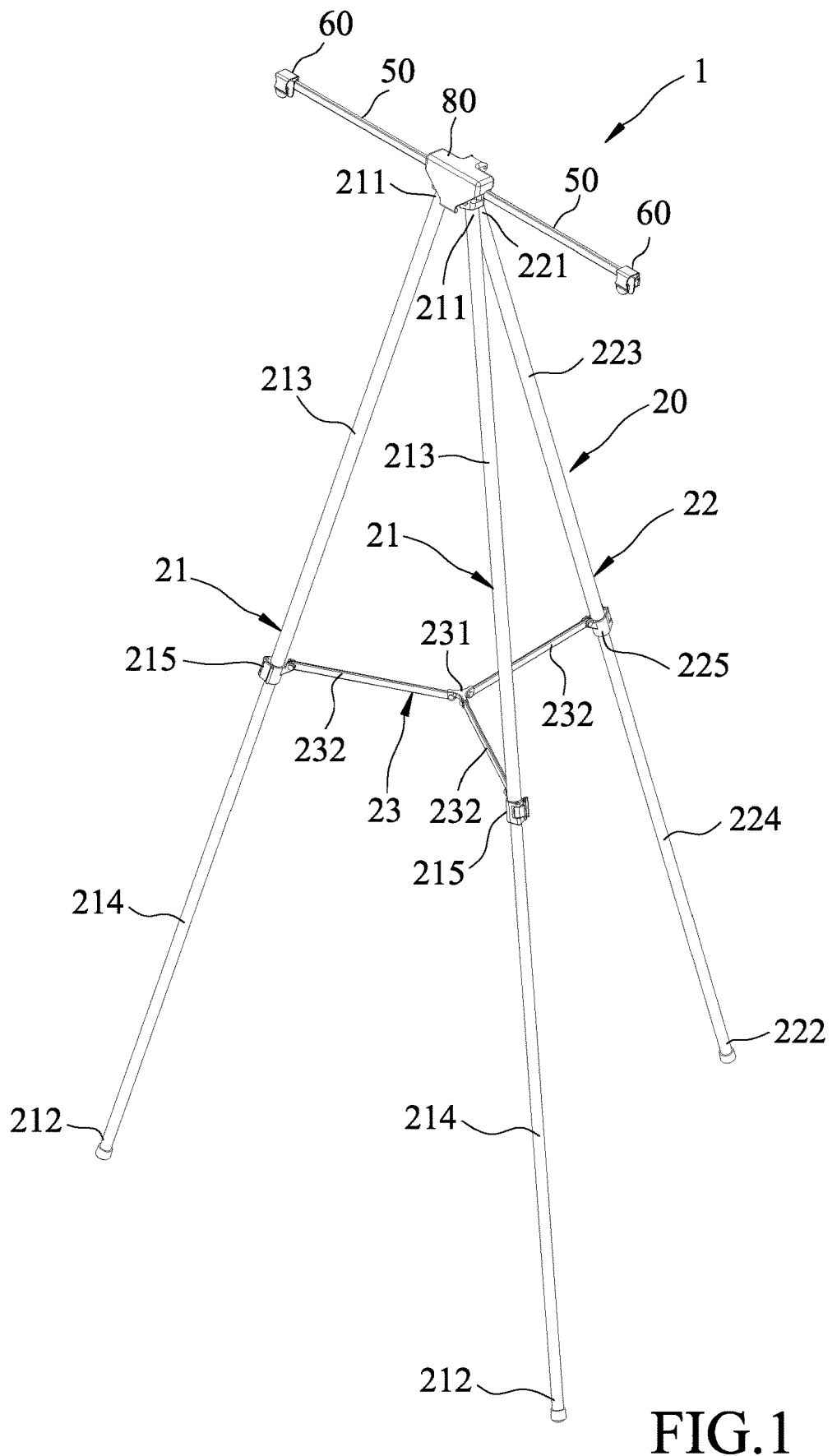
FIG. 1 is a front perspective view illustrating an embodiment of a foldable display stand according to the disclosure.
Figure 2:
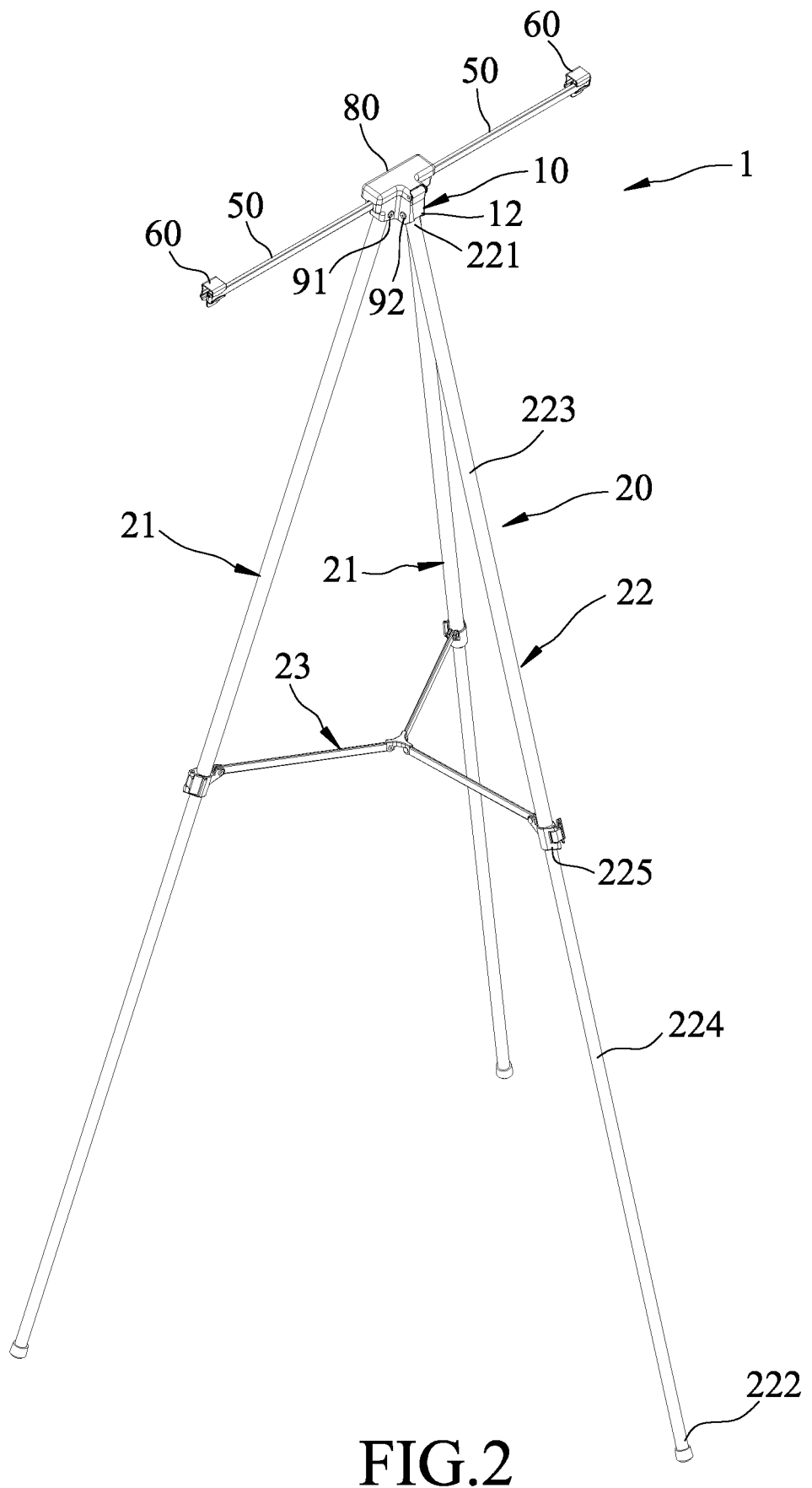
FIG. 2 is a rear perspective view illustrating the embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

In addition, it should be noted that, directional terms, such as "vertical," "horizontal," "upper," "lower," "inner," "inwardly," "outer," "outwardly," "front," "rear," "left," "right", "top" and "bottom," maybe used to assist in describing the disclosure based on the orientation of the embodiment shown in the illustrations. The use of these directional definitions should not be interpreted to limit the disclosure in any way.

Figure 3:
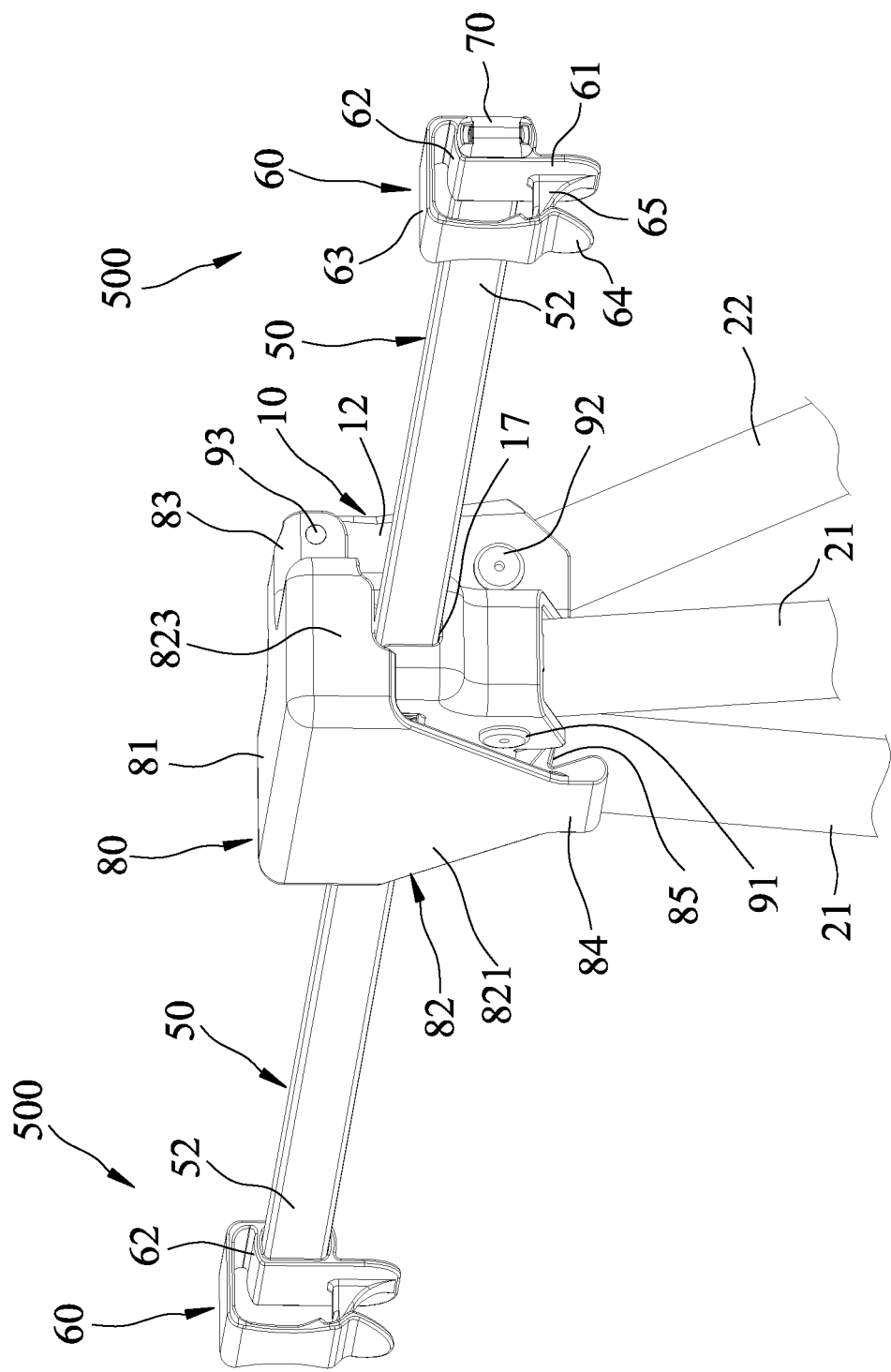
FIG. 3 is a fragmentary perspective view illustrating a top lid of the embodiment at an enclosed position.
Figure 4:
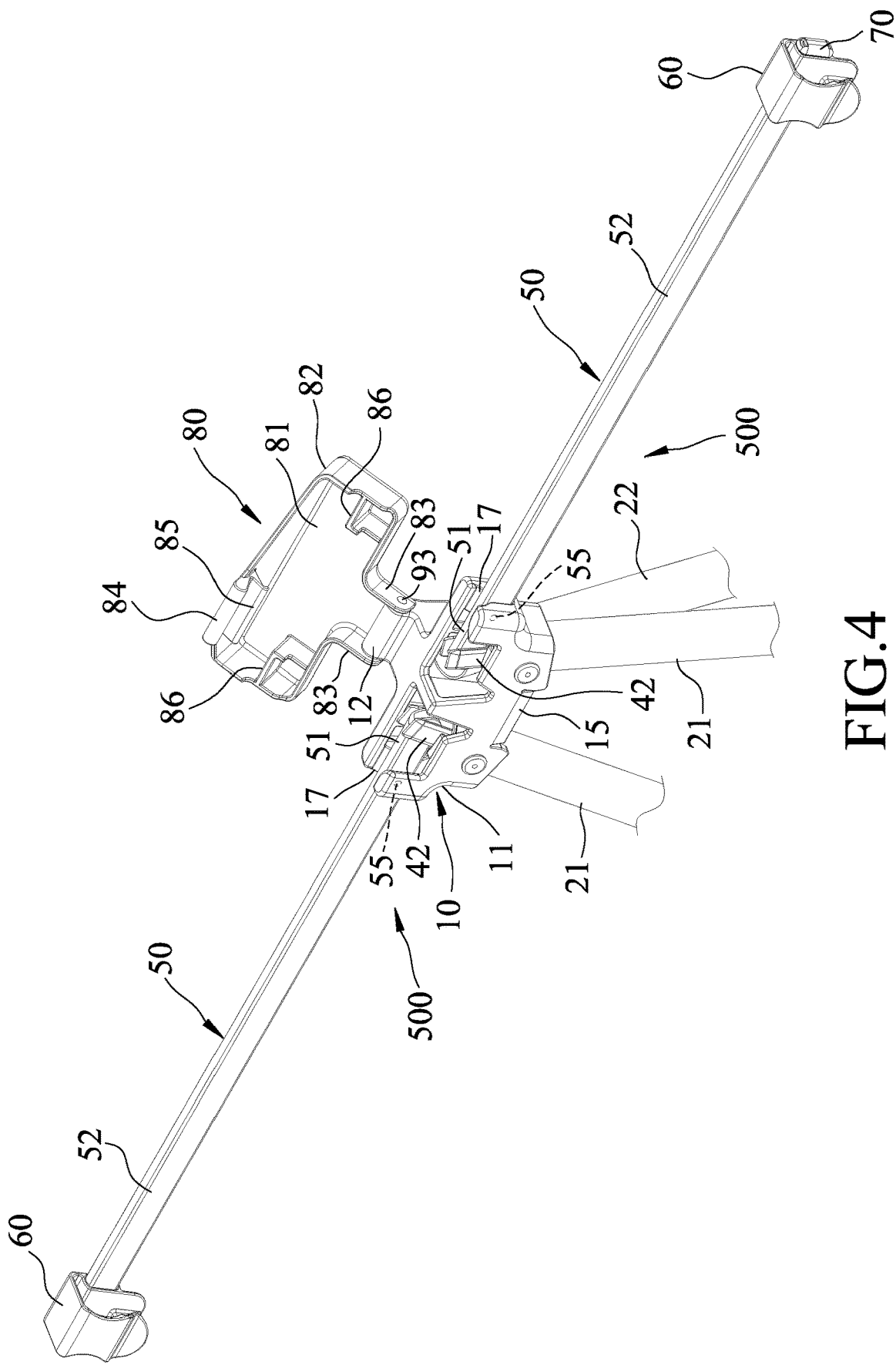
FIG. 4 is a fragmentary perspective view illustrating the top lid at an open position.
Figure 5:
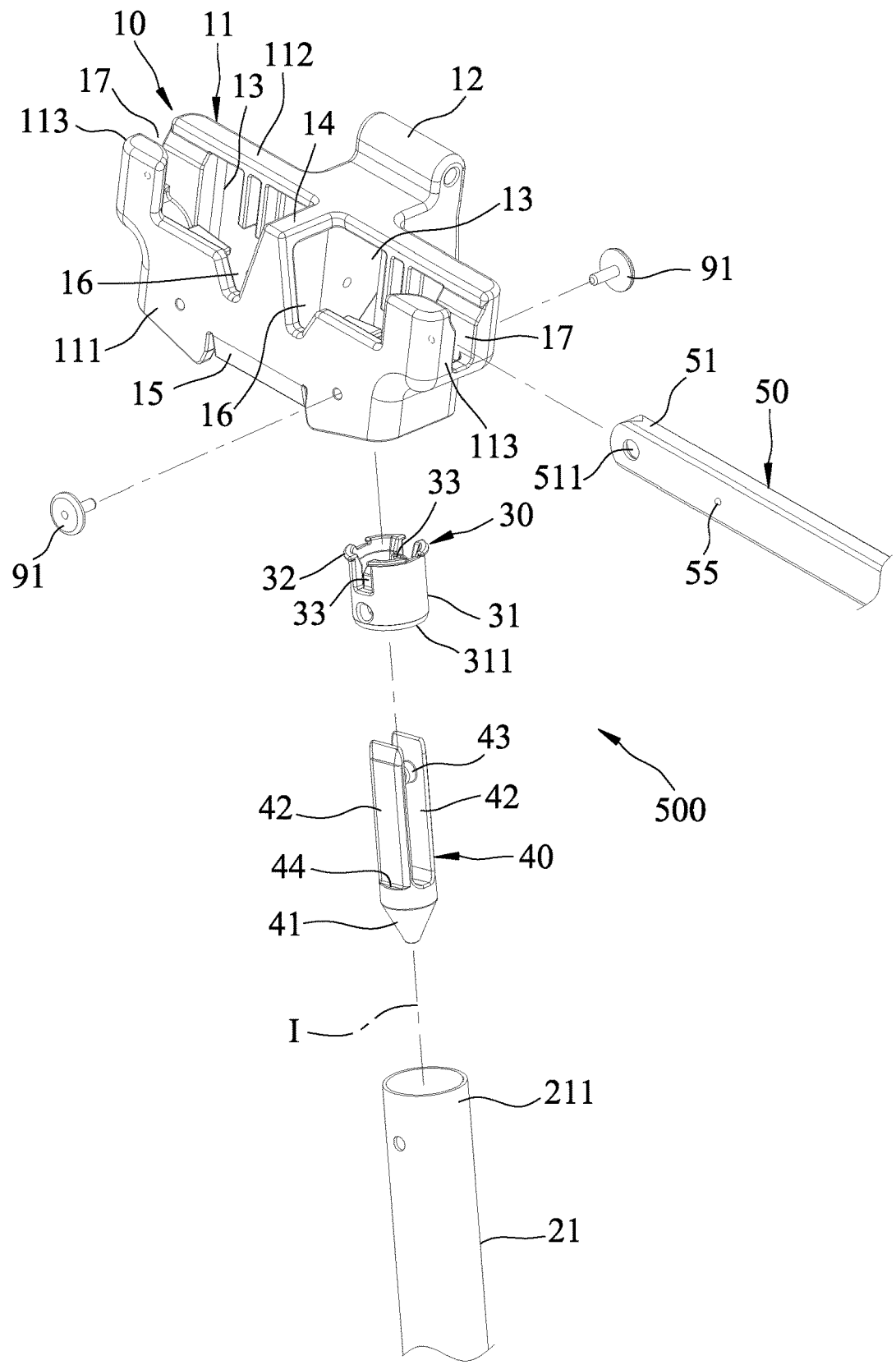
FIG. 5 is a fragmentary, exploded perspective view illustrating the embodiment.
Figure 6:
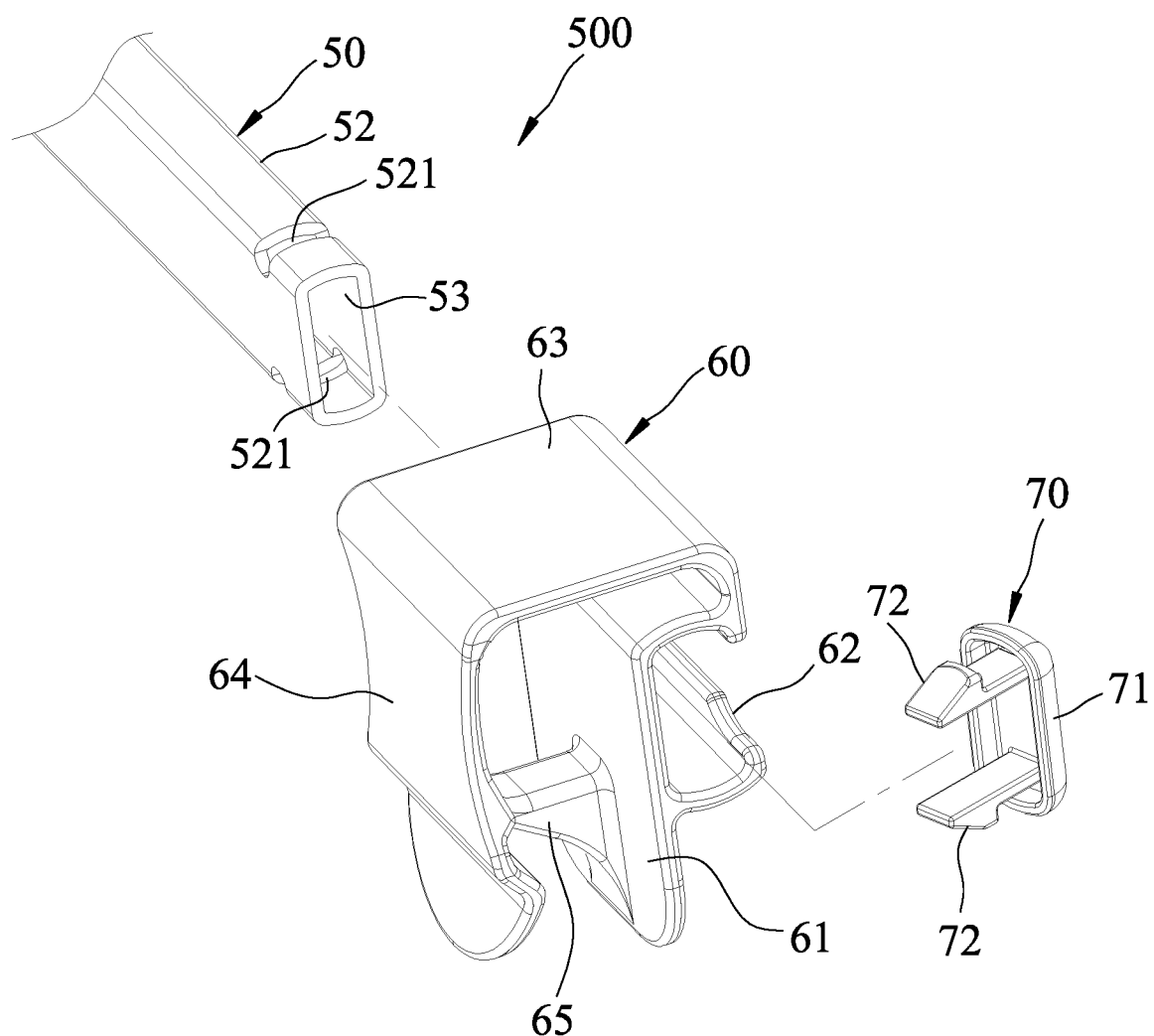
FIG. 6 is a fragmentary, exploded perspective view illustrating a support arm assembly of the embodiment.

Referring to FIGS. 1 to 6, an embodiment of a foldable display stand 1 according to the disclosure includes a base 10, a leg unit 20, two restraining members 30 (only one is shown in FIG. 5), two support arm assemblies 500 (see FIG. 3), two positioning sets 55 (see FIG. 4), a top lid 80, two first pivot members 92 (only one is shown in FIG. 3) and a second pivot member 93. It should be noted that, in FIG. 5, only one of the support arm assemblies 500 and one of the positioning sets 55 are shown.

Figure 7:
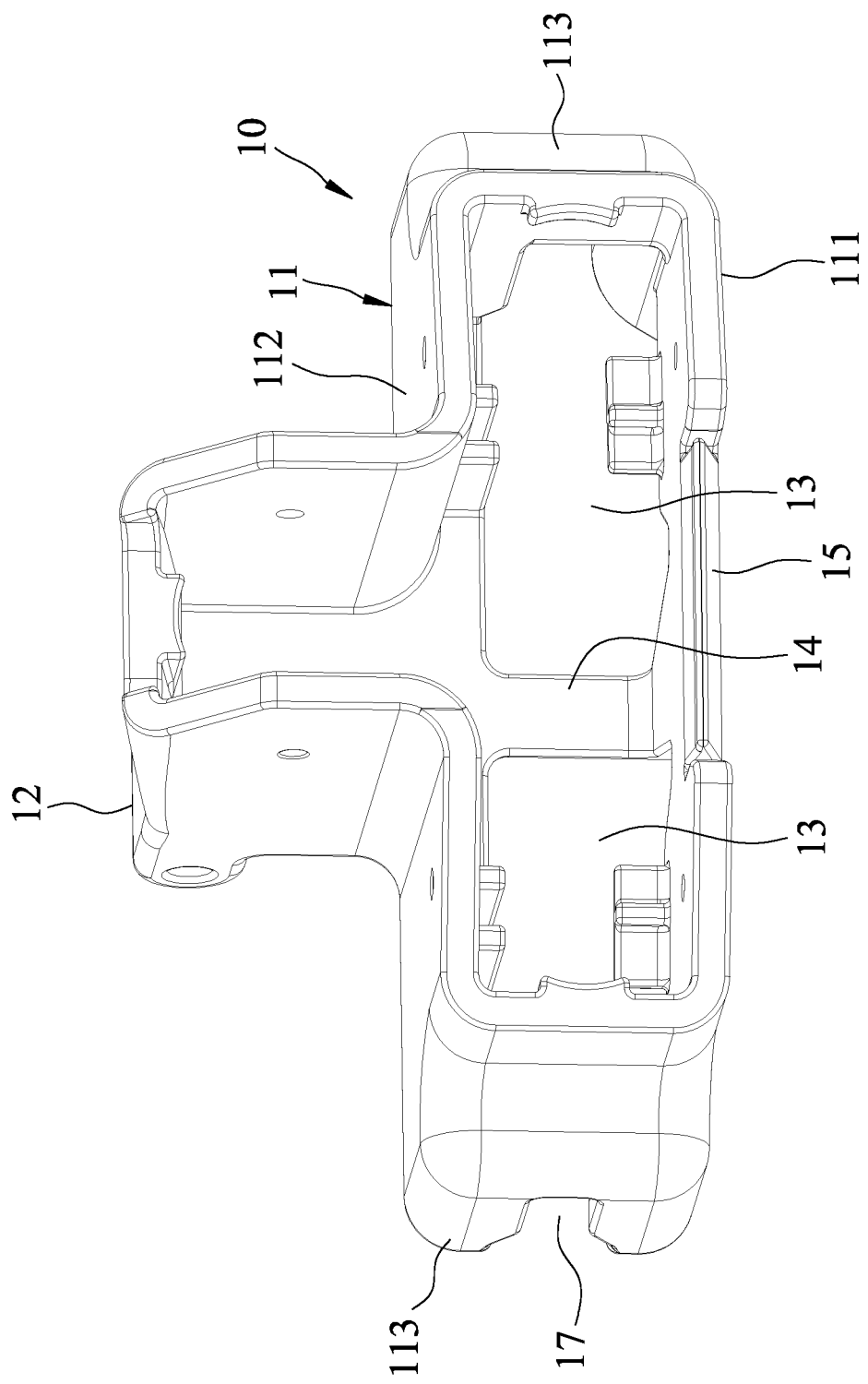
FIG. 7 is a perspective view illustrating a base of the embodiment.
Figure 8:
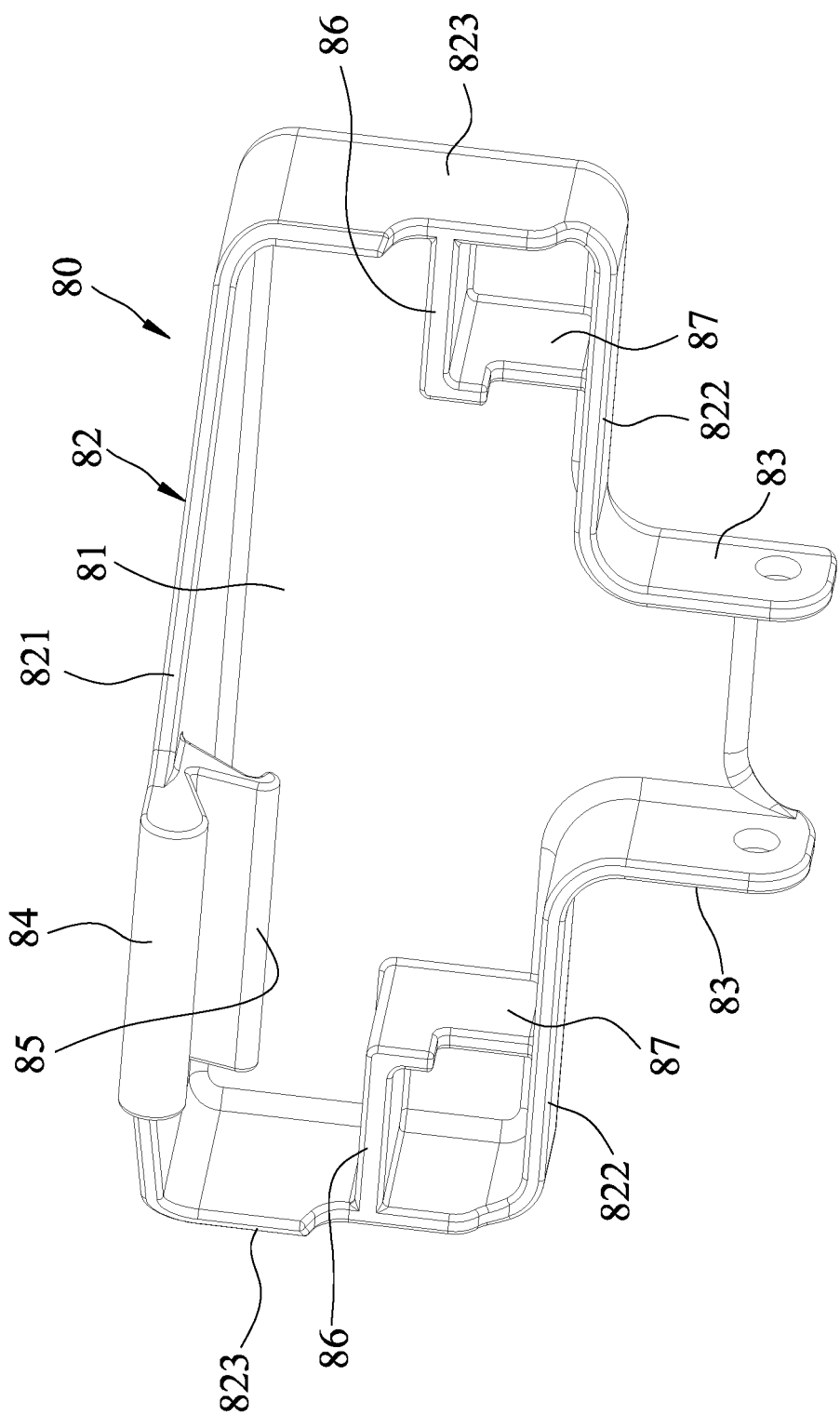
FIG. 8 is a perspective view illustrating the top lid of the embodiment.

Referring to FIGS. 5 and 7, the base 10 includes a surrounding wall 11, a lid connecting member 12, a partition 14, a lid engaging member 15, two accommodating grooves 16 and two restraining grooves 17. The surrounding wall 11 is cooperatively formed by a front wall 111, a rear wall 112 and two side walls 113. Furthermore, the front wall 111, the rear wall 112 and the side walls 113 cooperatively define an accommodating space that communicates with the external environment at a top end and at a bottom end of the surrounding wall 11. The lid connecting member 12 extends rearward from the rear wall 112, and defines amounting space that opens downward. The partition 14 is connected between the front wall 111 and the rear wall 112, and divides the accommodating space into two accommodating rooms 13. The lid engaging member 15 is disposed on a bottom end of the front wall 111, and is substantially a triangular prism (i.e., three-sided prism) having an inverted triangular cross-section. The accommodating grooves 16 are formed at the front wall 111, are adjacent to the partition 14, and open upward. In addition, the accommodating grooves 16 communicate with the external environment, and respectively communicate with the accommodating rooms 13. The restraining grooves 17 are respectively formed at the side walls 113, open upward, communicate with the external environment, and respectively communicate with the accommodating rooms 13.

Referring back to FIGS. 1 to 6 the leg unit 20 includes two main leg tubes 21, an auxiliary leg tube 22 and a connecting mechanism 23. Each of the main leg tubes 21 extends along an extending axis (I) and includes two third pivot members 91. Each of the main leg tubes 21 has a top part 211 that is connected to the base 10, and a bottom part 212 that is for stably abutting against the ground or any selected surface. The top part 211 of each of the main leg tubes 21 extends into a respective one of the accommodating rooms 13, and is pivotally connected to the front wall 111 and the rear wall 112 via the third pivot members 91. The two third pivot members 91 of each of the main leg tubes 21 form a pair, and are spaced apart from each other in a front-rear direction, so that each of the main leg tubes 21 is pivotable relative to the base 10 in a plane that has a normal parallel to the front-rear direction, with the third pivot members 91 serving as a pivot.

The auxiliary leg tube 22 of the leg unit 20 has a top part 221 and a bottom part 222 that is for stably abutting against the ground or any selected surface. The top part 221 extends into the lid connecting member 12 of the base 10, and is pivotally connected to the lid connecting member 12 via the two first pivot members 92. The two first pivot members 92 form a pair and are spaced apart from each other in a left-right direction, so that the auxiliary leg tube 22 is pivotable relative to the base 10 in a plane parallel to the front-rear direction, with the first pivot members 92 serving as a pivot.

According to the disclosure, each of the main leg tubes 21 may be a single-piece tube, or a telescopic tube assembly that includes a top tube body 213 and a bottom tube body 214. According to the disclosure, the auxiliary leg tube 22 may be a single-piece tube, or a telescopic tube assembly that includes a top tube body 223 and a bottom tube body 224. It should be noted that, the main leg tubes 21 and the auxiliary leg tube 22 are each exemplarily illustrated as an individual telescopic tube assembly in this embodiment. Furthermore, each of the main leg tubes 21 is provided with a quick-release clamp 215, such that the top tube body 213 and the bottom tube body 214 of the main leg tube 21 are able to be positioned or movable, relative to each other. The bottom tube body 224 is provided with a quick-release clamp 225, such that the top tube body 223 and the bottom tube body 224 are able to be positioned or movable relative to each other.

It should be noted that, in this embodiment, the top part 211 of each of the main leg tubes 21 and the top part 221 of the auxiliary leg tube 22 are pivotally connected to the base 10. However, in other embodiments, the effects and the purpose of the disclosure can stay the same as long as the top part 211 of each of the main leg tubes 21 and the top part 221 of the auxiliary leg tube 22 are connected to the base 10. The pivot connections may not be necessary.

The connecting mechanism 23 of the leg unit 20 includes a rod-connecting member 231 and three bracing rods 232. In the case where the main leg tubes 21 and the auxiliary leg tube 22 are configured as single-piece tubes, the bracing rods 232 are respectively and pivotally connected between the rod-connecting member 231 and one of the main leg tubes 21, between the rod-connecting member 231 and the other one of the main leg tubes 21, and between the rod-connecting member 231 and the auxiliary leg tube 22.

In the case where the main leg tubes 21 and the auxiliary leg tube 22 are telescopic tube assemblies as in this embodiment, the bracing rods 232 are respectively and pivotally connected between the rod-connecting member 231 and the quick-release clamp 215 on one of the main leg tubes 21, between the rod-connecting member 231 and the quick-release clamp 215 on the other one of the main leg tubes 21, and between the rod-connecting member 231 and the quick-release clamp 225 on the auxiliary leg tube 22.

Figure 14:
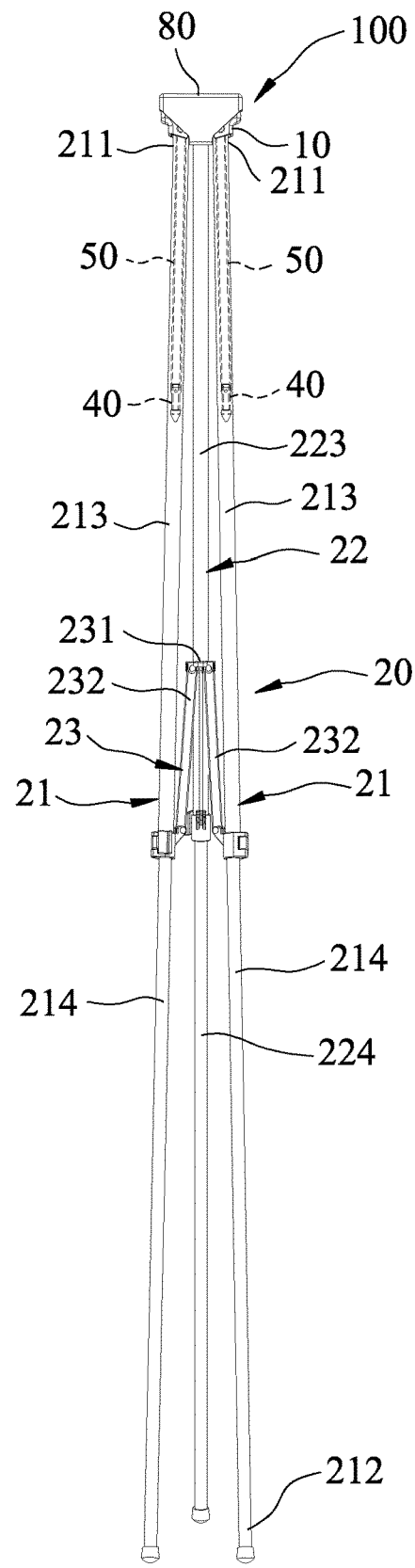
FIG. 14 is a front view illustrating the embodiment in one state.
Figure 15:
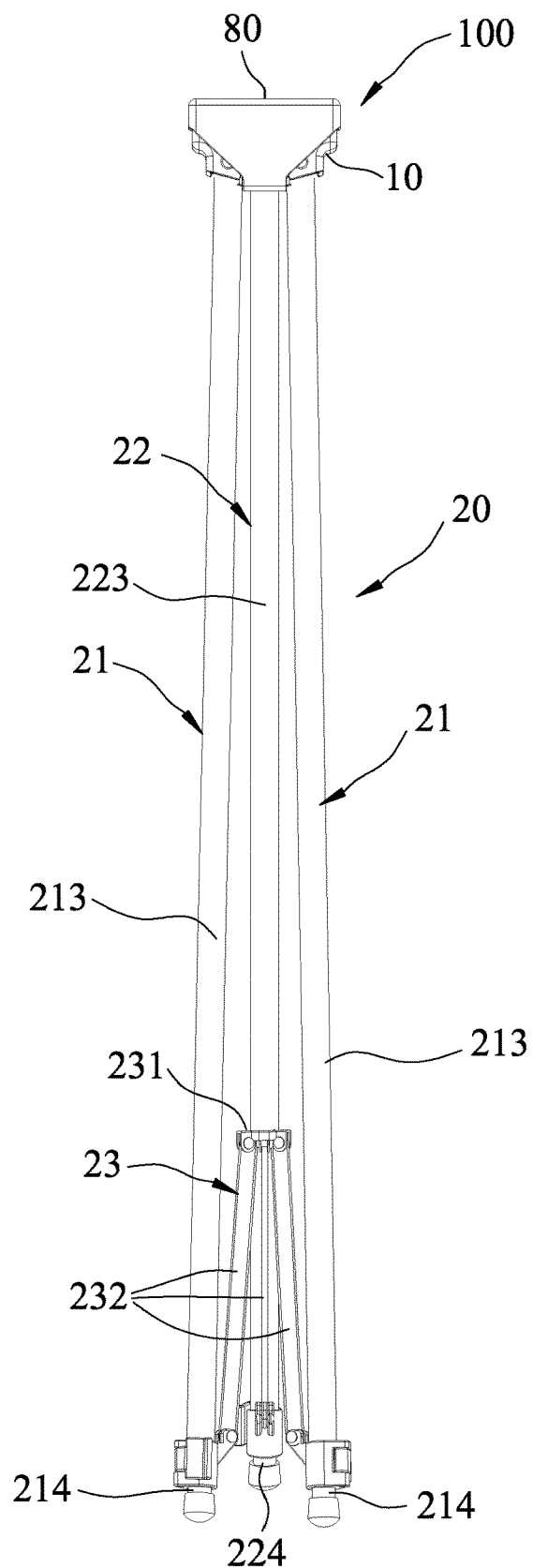
FIG. 15 is a front view illustrating the embodiment in another state.

When the rod-connecting member 231 is urged to be at a lowermost position relative to the base 10, each of the bracing rods 232 may be substantially parallel to the ground or selected surface, and the bottom parts 212 of the main leg tubes 21 and the bottom part 222 of the auxiliary leg tube 22 are distal to one another. At this time, the leg unit 20 is said to be in an unfolded state (see FIG. 1). When the rod-connecting member 231 is urged to be at an uppermost position relative to the base 10, each of the bracing rods 232 may be substantially perpendicular to the ground or selected surface, and the bottom parts 212 of the main leg tubes 21 and the bottom part 222 of the auxiliary leg tube 22 are close to one another. At this time, the leg unit 20 is said to be in a folded state (see FIG. 14).

Figure 9:
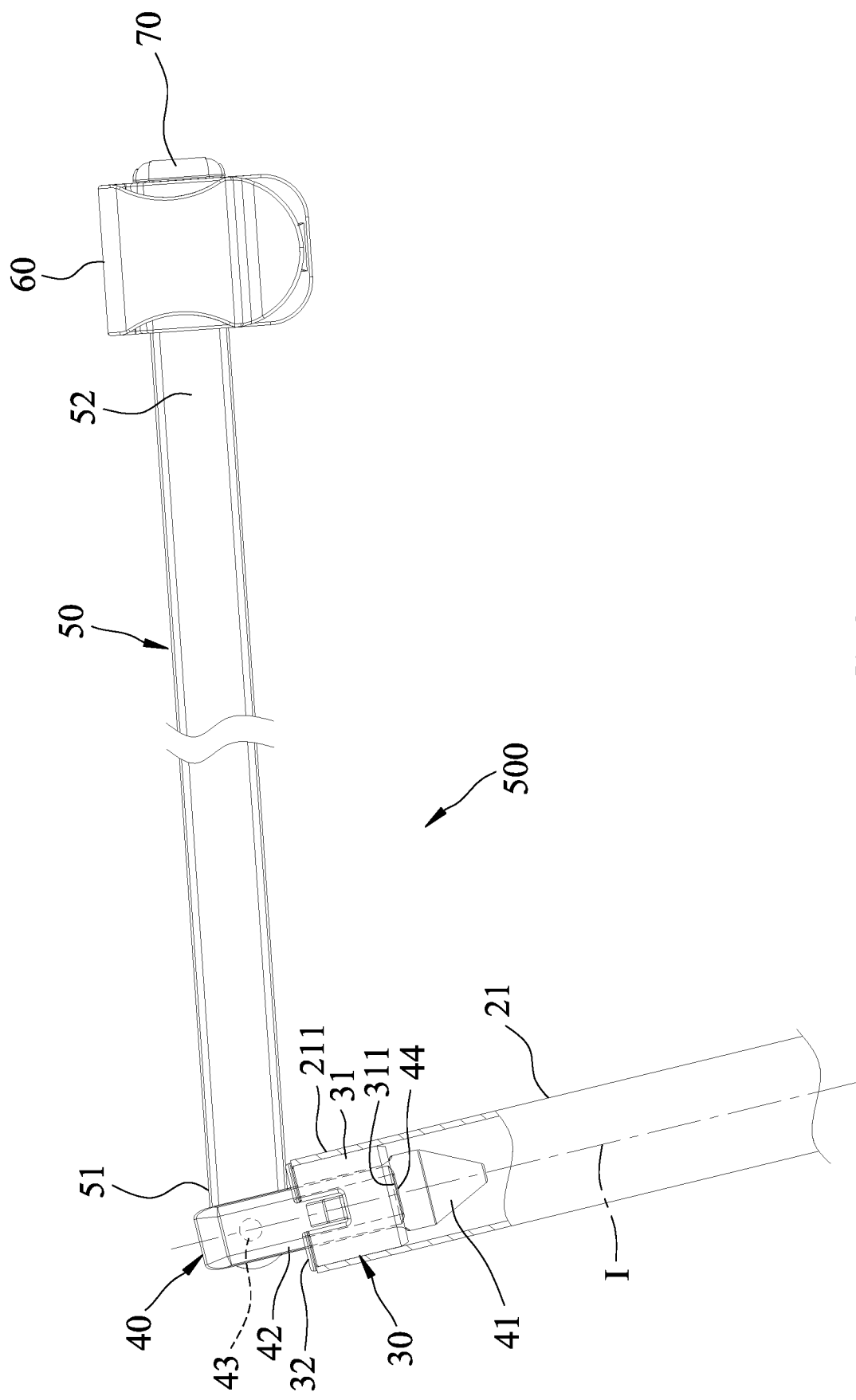
FIG. 9 is a fragmentary, partly sectional front view illustrating the support arm assembly in a display state.
Figure 11:
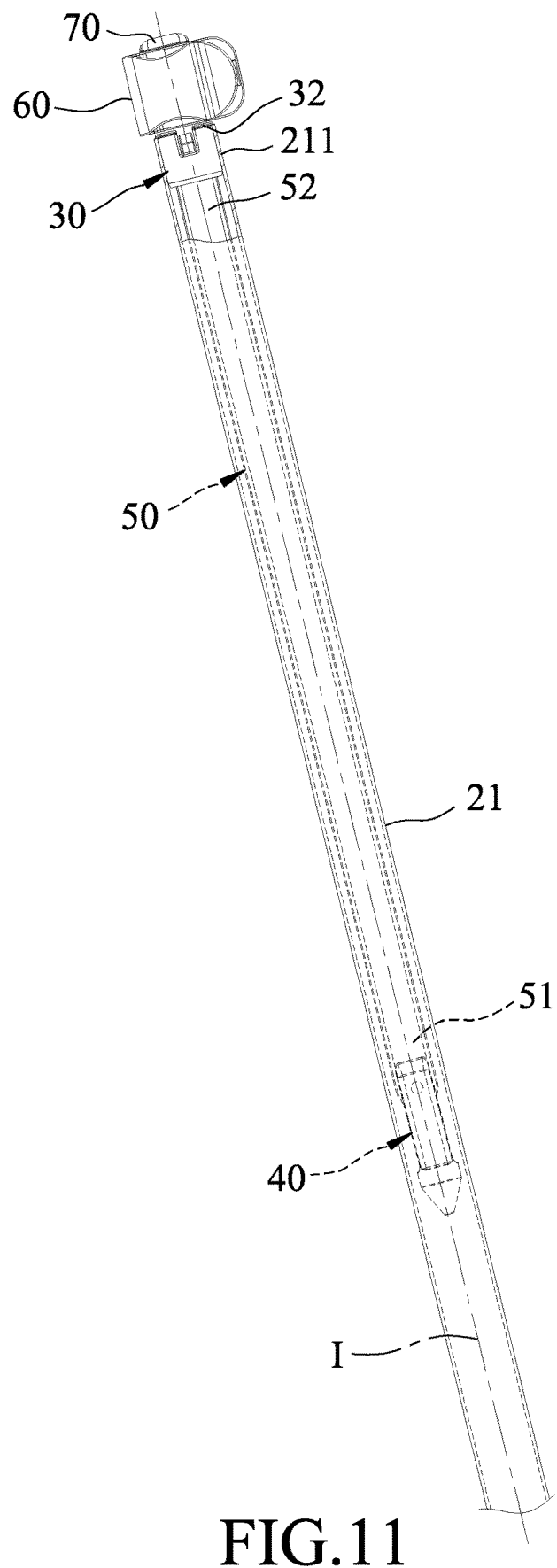
FIG. 11 is a fragmentary, partly sectional front view illustrating the support arm assembly in a storage state.

Further referring to FIGS. 9 and 11, which both show one of the main leg tubes 21, one of the restraining members 30 and one of the support arm assemblies 500, each of the restraining members 30 is connected to a respective one of the main leg tubes 21, and includes a hollow cylinder 31, a blocking rim 32 and two holders 33. The hollow cylinder 31 of each of the restraining members 30 is fixedly disposed on the top part 211 of the respective one of the main leg tubes 21, has a bottom surface 311, and surrounds the extending axis (I) of the respective one of the main leg tubes 21. The blocking rim 32 of each of the restraining members 30 is integrally formed with a top end of the hollow cylinder 31 of the restraining member 30, and is located over and abuts against the top part 211 of the respective one of the main leg tubes 21. The holders 33 of each of the restraining members 30 are disposed on the hollow cylinder 31 of the restraining member 30, are tongue-shaped, and are bent toward the extending axis (I) of the respective one of the main leg tubes 21 so as to incline toward each other.

The support arm assemblies 500 are each mounted to a respective one of the main leg tubes 21 and thus correspond to one of the restraining members 30 to which the respective one of the main leg tubes 21 is connected. Each of the support arm assemblies 500 includes a connecting member 40, a support arm 50, a clamping member 60 and an end lid 70. The connecting member 40 of each of the support arm assemblies 500 is movable along the extending axis (I) of the respective one of the main leg tubes 21 and includes a main body 41, two pivot lugs 42, two protrusions 43 (only one is shown) and two blocking surfaces 44 (only one is shown). The main body 41 of each of the support arm assemblies 500 is for separably engaging the hollow cylinder 31 of the respective one of the restraining members 30. The pivot lugs 42 of each of the support arm assemblies 500 are spaced apart from each other in the front-rear direction, extend substantially upward from the main body 41, and are parallel to each other. The protrusions 43 of each of the support arm assemblies 500 are respectively disposed on the pivot lugs 42 of the support arm assembly 500, are spaced apart from each other in the front-rear direction, and protrude toward each other. The blocking surfaces 44 of each of the support arm assemblies 500 are respectively formed on the main body 41, at a location where the pivot lugs 42 begin to extend upward, and are able to be blocked by the bottom surface 311 of the hollow cylinder 31 of the corresponding one of the restraining members 30, so that the connecting member 40 is prevented from being separated from the respective one of the main leg tube during upward movement thereof relative to the respective one of the main leg tubes 21.

That is to say, by virtue of structural relationship between the hollow cylinder 31 of each of the restraining members 30 and the main body 41 of the corresponding one of the support arm assemblies 500, or. more specifically in this embodiment, by virtue of the bottom surface 311 of the hollow cylinder 31 blocking the blocking surfaces 44 of the main body 41 when the connecting member 40 is moved upward to a top end of the respective one of the main leg tubes 21, the connecting member 40 is blocked by the corresponding one of the restraining members 30 so as to be prevented from being separated from the main leg tube 21 during upward movement thereof relative to the respective one of the main leg tubes 21.

Figure 10:
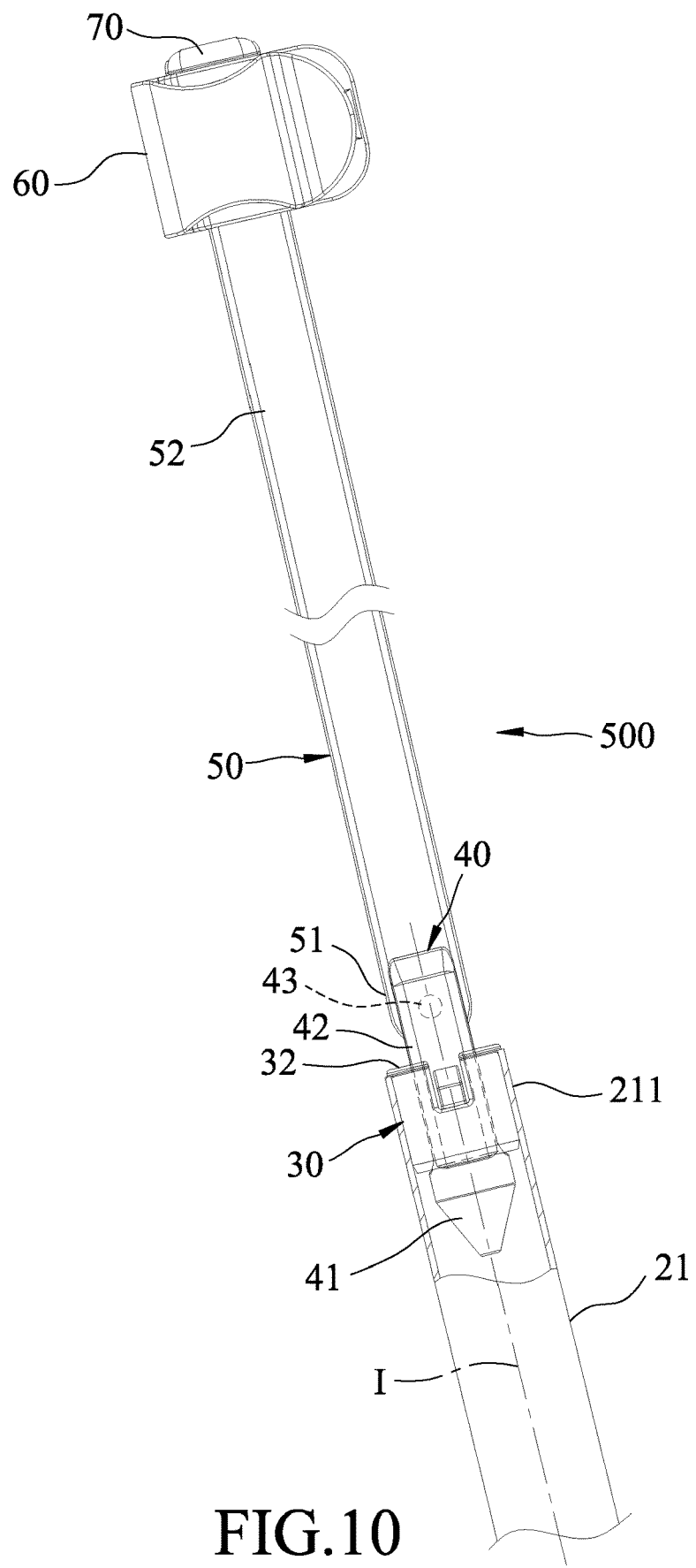
FIG. 10 is a fragmentary, partly sectional front view illustrating the support arm assembly in a projecting state.

Referring to FIGS. 3 to 6 again, the support arm 50 of each of the support arm assemblies 500 has a connecting section 51 and a free section 52. For each of the support arm assemblies 500, the connecting section 51 has a pivot hole 511 extending in the front-rear direction therethrough and is pivotally connected to the pivot lugs 42 of the support arm assembly 500. More specifically, for each of the support arm assemblies 500, the connecting section 51 is disposed between the pivot lugs 42 so as to permit the protrusions 43 of the connecting member 40 to engage the pivot hole 511 of the connecting section 51, so that the connecting section 51 is pivotally connected to the pivot lugs 42. Thus, with the protrusions 43 of each of the support arm assemblies 500 serving as a pivot, the support arm 50 of the support arm assembly 500 is pivotable relative to the connecting member 40 (see FIGS. 9 and 10). For each of the support arm assemblies 500, the free section 52 extends from the connecting section 51 away from the connecting member 40, is formed with an inner space 53 that has an opening facing away from the connecting section 51, and has two engaging holes 521 respectively communicating with the inner space 53.

It should be noted that variations to the pivot connection between the connecting section 51 and the connecting member 40 of each of the support arm assemblies 50 can be made. For example, the protrusions 43 of the connecting member 40 may be replaced by two pivot holes while the pivot hole 511 of the connecting section 51 is replaced by two protrusions. As another example, the pivot lugs 42 of the connecting member 40 may be omitted, and instead, the connecting section 51 of the support arm 50 may have two pivot lugs that are pivotally connected to the connecting member 40. Another option is for the protrusions 43 and the pivot hole 511 to be replaced by a pivotally connecting member (e.g., an axle) that is disposed between the connecting section 51 and the pivot lugs 42 of the connecting member 40, and that is able to pivotally connect the connecting section 51 and the connecting member 40.

Figure 13:
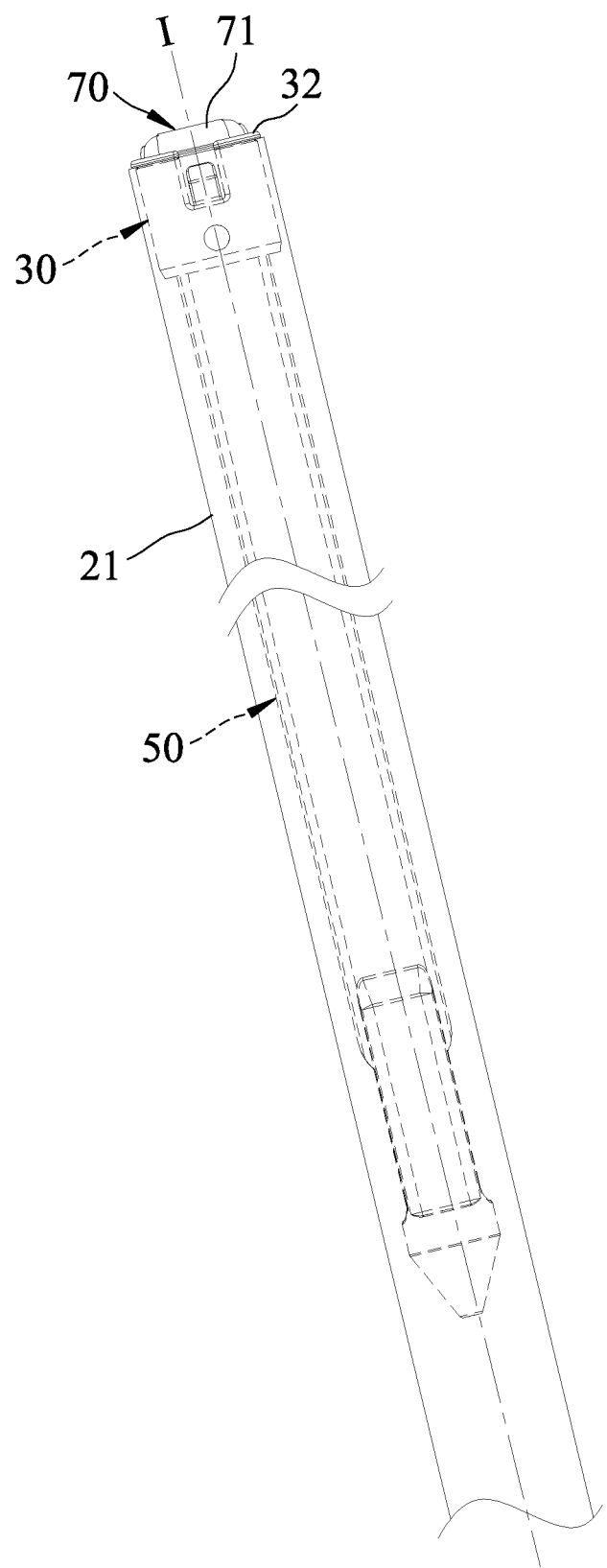
FIG. 13 is a fragmentary front view illustrating a restraining member of the embodiment that abuts against an end lid of the embodiment.

Furthermore, each of the support arm assemblies 500 is convertible among different states: a storage state where the support arm 50 of the support arm assembly 500 is substantially retracted into the respective one of the main leg tubes 21 (see FIG. 13); a projecting state (see FIG. 10) where the support arm 50 substantially projects out of the respective one of the main leg tubes 21 and where the support arm 50 extends along the extending axis (I) of the respective one of the main leg tubes 21; and a display state (see FIG. 9) where the support arm 50 extends in a direction transverse to the direction of the extending axis (I) of the respective one of the main leg tubes 21.

The clamping member 60 of each of the support arm assemblies 500 is removably connected to the support arm 50 of the support arm assembly 500, and includes a base board 61, a sliding seat 62, a top board 63, a resilient clamping board 64 and a fixing protrusion 65. The base board 61 of each of the support arm assemblies 500 substantially extends in a plane that has a normal extending in the front-rear direction. The sliding seat 62 of each of the support arm assemblies 500 is formed at a rear surface of the base board 61, and is in slidable contact with the free section 52 of the support arm 50 of the support arm assembly 500. The top board 63 of each of the support arm assemblies 500 extends forward from a top end of the sliding seat 62 and has a front end that is distal to the top end of the sliding seat 62. The resilient clamping board 64 of each of the support arm assemblies 500 extends downward from the front end of the top board 63. The fixing protrusion 65 of each of the support arm assemblies 500 extends forward from the base board 61 and is located between the base board 61 and the resilient clamping board 64.

In addition, the resilient clamping board 64 of each of the support arm assemblies 500 is able to be resiliently deformed away from the fixing protrusion 65 by an external force, and is able to restore to an initial position that is proximate to the fixing protrusion 65 when the external force ceases to exist. Therefore, the resilient clamping board 64 and the fixing protrusion 65 of each of the support arm assemblies 500 are able to cooperatively clamp an object (not shown) so as to display the object (e.g., a painting or a photo).

The end lid 70 of each of the support arm assemblies 500 includes a blocking board 71 and two snap-fits 72 that extend from the blocking board 71. For each of the support arm assemblies 500, the blocking board 71 is able to close the opening of the inner space 53 of the support arm 50 when the two snap-fits 72 enter the inner space 53 and respectively engage the engaging holes 521 of the free section 52 of the support arm 50. By virtue of the blocking board 71, the end lid 70 is able to prevent the clamping member 60 from being separated from the support arm 50 when the clamping member 60 moves along the support arm 50.

Furthermore, when the clamping member 60 is removed from the support arm 50 and when the support arm assembly 500 is in the storage state, the blocking board 71 is able to abut against the blocking rim 32 (see FIG. 13) of the respective one of the restraining members 30 so as to position the support arm 50 relative to the top part 211 of the respective one of the main leg tubes 21. Therefore, the support arm 50 is still reachable even when substantially retracted into the respective one of the main leg tubes 21.

Each of the positioning sets 55 (see FIGS. 4 and 5) may be a snap-fit mechanism that includes a recess and a projection respectively disposed on the base 10 and the support arm 50 of a respective one of the support arm assemblies 500.

Referring to FIGS. 1 to 5, and 8, the top lid 80 is pivotally connected to the lid connecting member 12 of the base 10 by the second pivot member 93 and is able to pivot relative to the base 10 between an enclosed position (see FIG. 3) where the top lid 80 covers a top end of the base 10 and an open position (see FIG. 4) where the top lid 80 uncovers the top end of the base 10.

The following description with regard to the top lid 80 contains directional or position-related statements that are to be understood under the circumstance that the top lid 80 is in the enclosed position. The top lid 80 includes a cover plate 81, a surrounding wall 82, two pivot protrusions 83, a operating member 84, a base engaging member 85, two pressing members 86 and two reinforcing members 87. The surrounding wall 82 is cooperatively formed by a front plate 821, two side plates 823 and two rear plates 822 respectively connected to the side plates 823. Each of the front plate 821, the side plates 823 and the rear plates 822 extends from a periphery of the cover plate 81. The pivot protrusions 83 respectively extend rearward from the rear plates 822. The operating member 84 is disposed on a bottom end of the front plate 821. The base engaging member 85 is disposed on the operating member 84, and corresponds in position to the lid engaging member 15 of the base 10. Each of the pressing members 86 is connected to the cover plate 81 and a respective one of the side plates 823, substantially extends in a plane perpendicular to the cover plate 81 and the respective one of the side plates 823, and corresponds in position to a respective one of the restraining grooves 17 of the base 10. Each of the reinforcing members 87 is connected to the cover plate 81, a respective one of the rear plates 822 and a respective one of the pressing members 86. In addition, the reinforcing members 87 are for improving the structural strength of the pressing members 86 respectively.

The second pivot member 93 is inserted into the pivot protrusions 83 and the connecting member 12 in the left-right direction so as to pivotally interconnect the top lid 80 and the lid connecting member 12, so that the top lid 80 is able to pivot, with the second pivot member 93 serving as a pivot, relative to the base 10 between the enclosed position and the open position.

When the foldable display stand 1 is in use, the leg unit 20 is in the unfolded state and the support arm assemblies 500 are in the display state. In the meantime, the connecting section 51 of the support arm 50 of each of the support arm assemblies 500 is located above the corresponding one of the restraining members 30, and the free section 52 of the support arm 50 extends through a respective one of the restraining grooves 17 and extends outward of the base 10. For each of the support arm assemblies 500, the weight of the support arm 50 urges the connecting member 40 to move substantially upward to the top end of the respective one of the main leg tubes 21. By virtue of the bottom surface 311 of the hollow cylinder 31 and the blocking surfaces 44 of the connecting member 40, the connecting member 40 is prevented from being separated from the main leg tube 21, and the support arm 50 becomes more stable in the display state. In addition, the top lid 80 can be operated to pivot to the enclosed position, so that the top lid 80 covers the base 10 and a top end of the connecting member 40, in a manner that the cover plate 81 of the top lid 80 covers the top end of the base 10 and part of the connecting member 40 that is in the base 10 and that the surrounding wall 82 of the top lid 80 substantially covers the surrounding wall 11 of the base 10. In the meantime, the pressing members 86 of the top lid 80 would respectively press the free sections 52 of the support arms 50 so as to cooperate with the restraining grooves 17 to restrain the support arms 50. Furthermore, the base engaging member 85 of the top lid 80 can be operated to engage the lid engaging member 15 of the base 10, so that the top lid 80 is prevented from being pivoted to the open position from unintentional operation.

In order to display the object at a preferable position, the clamping member 60 of each of the support arm assemblies 500 can be moved along the support arm 50 by virtue of the sliding seat 62 of the clamping member 60. Then the resilient clamping board 64 and the fixing protrusion 65 of the clamping member 60 can be operated to cooperatively clamp the object. According to the object's size, a user may use only one, or both of the clamping members 60 of the support arm assemblies 500 to clamp and display the object.

Referring to FIGS. 1, 4, 9, 12 and 15, the following operations can be performed when the foldable display stand 1 is to be folded or stored.

First, the operating member 84 of the top lid 80 is pulled forward so as to disengage the base engaging member 85 from the lid engaging member 15, and the top lid 80 is therefore permitted to pivot to the open position. Then, each of the support arm assemblies 500 is converted to the projecting state when the support arm 50 of the support arm assembly 500 is pivoted to a position where the support arm 50 extends along the extending axis (I) of the respective one of the main leg tubes 21 of the leg unit 20. Next, by exerting a pushing force on the support arm 50 toward a bottom end of the respective one of the main leg tubes 21, or by virtue of the weight of the support arm 50, the connecting member 40 of the support arm assembly 500 can move along the main leg tube 21 away from the respective one of the restraining members 30, and the support arm 50 can be substantially retracted into the main leg tube 21.

Figure 12:
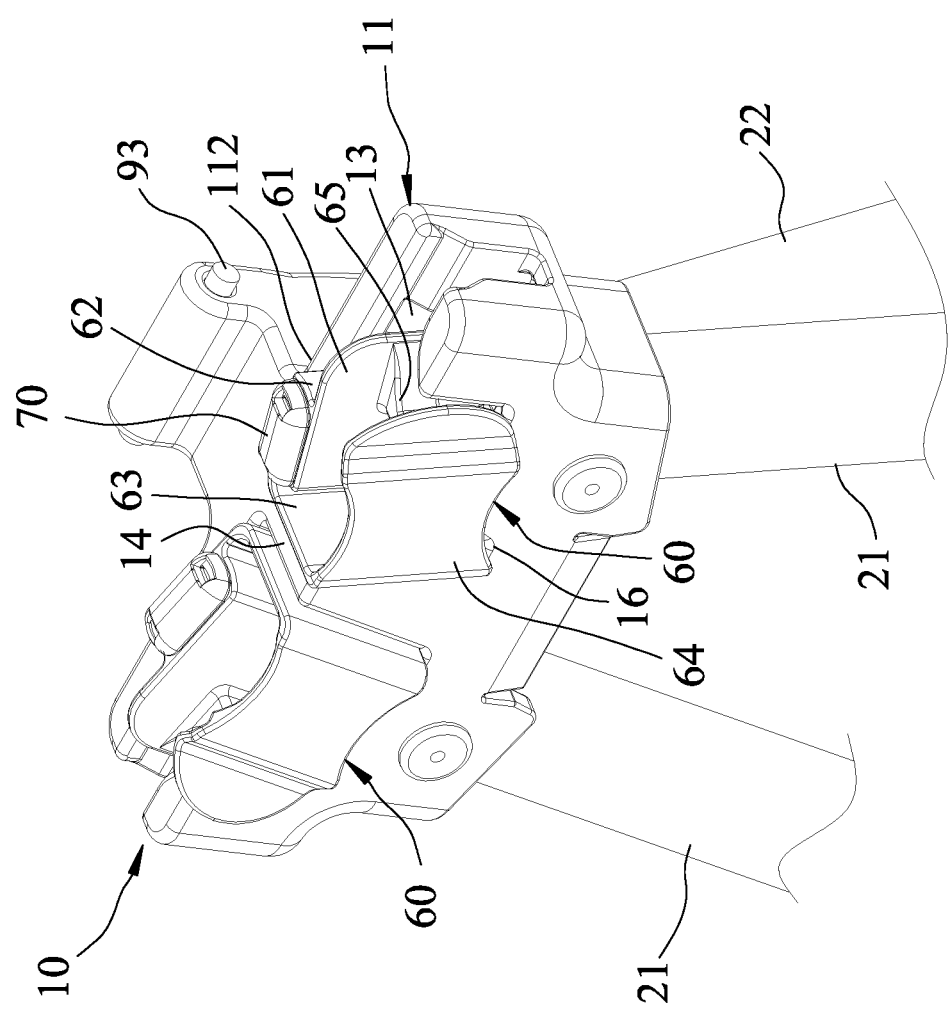
FIG. 12 is a fragmentary perspective view illustrating the support arm assemblies in the storage state.

In the meantime, the clamping member 60 of each of the support arm assemblies 500 is substantially positioned in a respective one of the accommodating rooms 13 of the base 10 with the top board 63 of the clamping member 60 partially disposed in a respective one of the accommodating grooves 16 of the base 10 (see FIG. 12). Consequently, the support arm assemblies 500 are converted from the display state into the storage state. Then, the top lid 80 is pivoted back to the enclosed position so that the base engaging member 85 of the top lid 80 engages the lid engaging member 15 of the base 10 again, and the top lid 80 cooperates with the base 10 to completely cover the clamping members 60. Subsequently, the rod-connecting member 231 of the connecting mechanism 23 of the leg unit 20 can be pulled upward so that the bracing rods 232 of the connecting mechanism 23 urge the bottom parts 212 of the main leg tubes 21 and the bottom part 222 of the auxiliary leg tube 22 to approach one another. Therefore, the leg unit 20 is converted from the unfolded state into the folded state.

Finally, the bottom tube bodies 214, 224 of the main and auxiliary leg tubes 21, 22 can be retracted into the top tube bodies 213, 223 of the main and auxiliary leg tubes 21, 22, respectively, further reducing the size of the foldable display stand 1 so that the user is offered with easy portability.

When the support arm assemblies 500 are required to be converted from the storage state into the display state, after the top lid 80 is pivoted to the open position, the support arms 50 can be respectively pulled out from the main leg tubes 21 of the leg unit 20. FIGS. 11 to 9, viewed in descending order, show a sequence of steps taken to convert one support arm assembly 500 from the storage state into the display state.

It is noted that, in certain embodiments, the clamping members 60 of the support arm assemblies 500 may be omitted. The user may use a conventional clamping member to attach the object on the support arm 50 of either one of the support arm assemblies 500 so as to display the object. It should be noted that, even if the clamping members 60 are omitted, when the support arm assemblies 500 are in the storage state, each of the support arms 50 is still positioned relative to the top part 211 of the respective one of the main leg tubes 21, by virtue of the blocking board 71 abutting against the blocking rim 32 to prevent the support arms 50 from completely retracting into the main leg tubes 21 (see FIG. 13).

Figure 16:
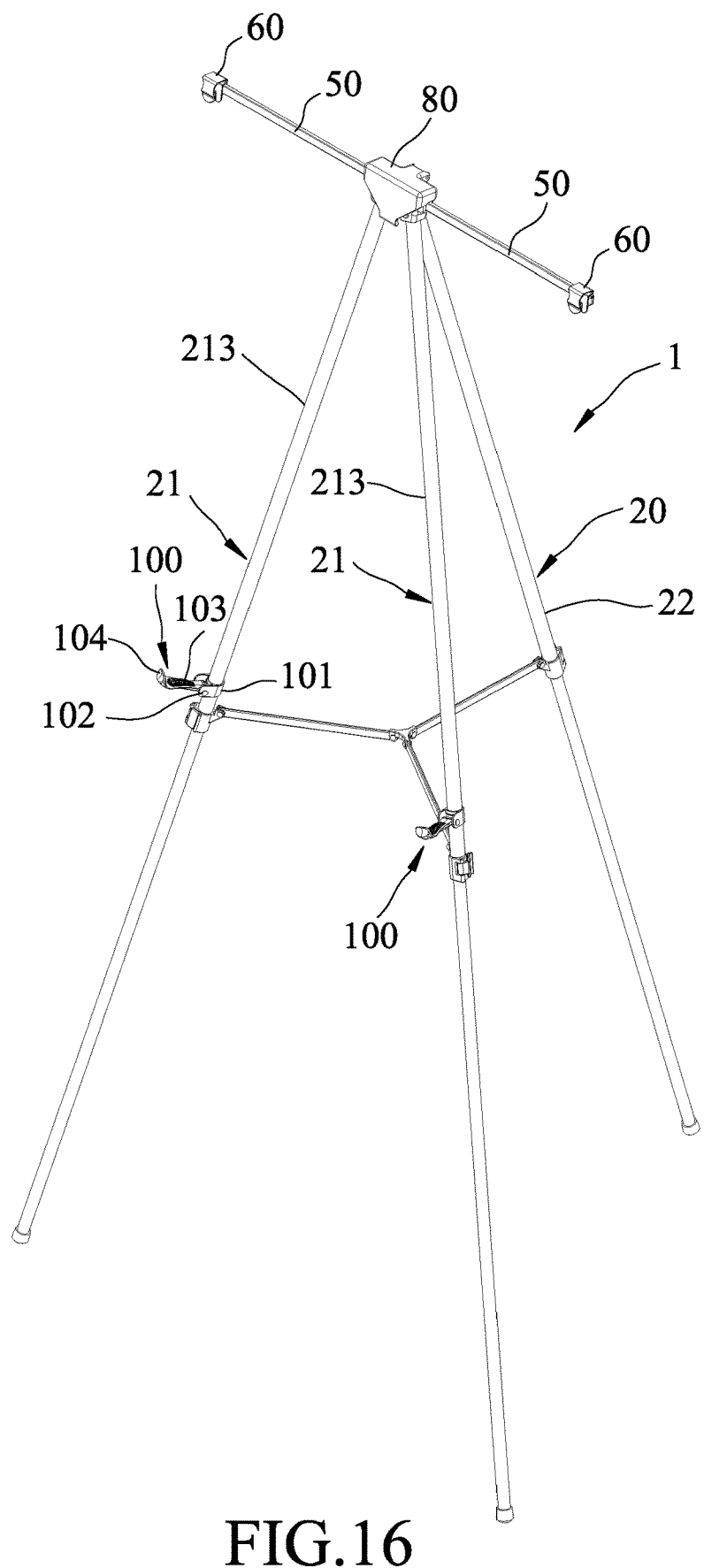
FIG. 16 is a perspective front view illustrating two supporting units of the embodiment that are respectively disposed on two leg tubes of the embodiment.
Figure 17:
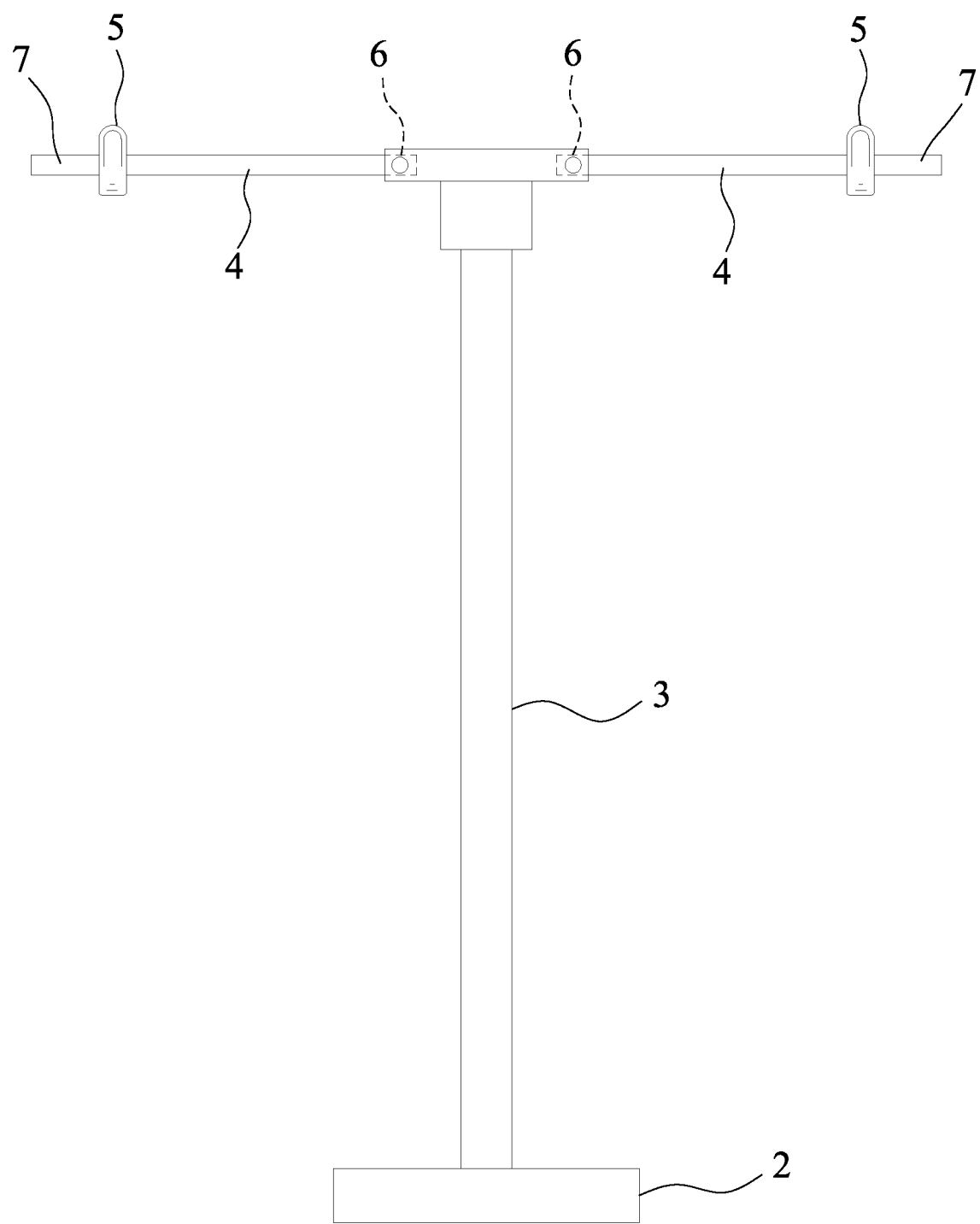
FIG. 17 is a schematic view illustrating a conventional foldable display stand.

Referring to FIG. 16, the foldable display stand may further include two supporting units 100 respectively disposed on the main leg tubes 21 of the leg unit 20. Each of the supporting units 100 includes a clamp ring 101, a fourth pivot member 102, an object supporting member 103 and a supporting protrusion 104. The clamp ring 101 is disposed on the respective one of the main leg tubes 21. The object supporting member 103 is pivotally disposed, via the fourth pivot member 102, on the clamp ring 101 at one end of the object supporting member 103. The supporting protrusion 104 is disposed on a free end of the object supporting member 103. The supporting units 100 are able to cooperate with the clamping members 60, or with the conventional clamping member to display the object. Furthermore, under the abovementioned circumstance where the clamping members 60 are omitted, the object can still be displayed with the supporting units 100 supporting the object from below and the support arms 50 in the display state supporting the object from behind.

In summary, by virtue of the restraining members 30 that are respectively disposed on the top parts 211 of the main leg tubes 21, the connecting members 40 of the support arm assemblies 500 are respectively movable along the main leg tubes 21 and are prevented from being separated from the main leg tubes 21 in the upward direction. Therefore, for the support arms 50 of the support arm assemblies 500 that are respectively and pivotally connected to the connecting members 40 with the connecting sections 51 thereof, conversion among the storage state, the projecting state and the display state can be relatively simple. When the support arm assemblies 500 are in the display state, the free sections 52 of the support arms 50 respectively extend through the restraining grooves 17 of the base 10, and are respectively pressed by the pressing members 86 of the top lid 80. Furthermore, for each of the support arm assemblies 500, the connecting section 51 of the support arms 50 and the pivot lugs 42 may be provided with an engaging mechanism (not shown) to provide increased fastening effect in addition to the fastening effect provided by the respective one of the positioning sets 55. The stability of the support arms 50 is improved compared to the prior art. When the support arm assemblies 500 are in the storage state, each of the connecting members 40 and each of the support arms 50 are retracted into the respective one of the main leg tubes 21, and the clamping members 60 are respectively and substantially positioned in the accommodating rooms 13 of the base 10. Therefore, after the base engaging member 85 of the top lid 80 is engaged with the lid engaging member 15 of the base 10, the clamping members 60 are covered and restrained by both the base 10 and the top lid 80, so that the clamping members 60 are secured for storage. In the meantime, the restraining members 30 and the support arm assemblies 500 are withdrawn from sight (see FIGS. 14 and 15) by virtue of the main leg tubes 21, the base 10 and the top lid 80. Therefore, the support arms 50 do not swing around external to the foldable display stand land will not pinch the user's fingers. Therefore, the embodiment of the foldable display stand 1 has a neater appearance, is easier to store and transport, and is safer when folded, and the purpose of the disclosure is fulfilled.

In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic maybe included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A foldable display stand comprising:
   a base;
   a leg unit including two leg tubes, each of said leg tubes having a top part that is connected to said base;
   two restraining members respectively disposed on said top parts of said leg tubes; and
   two support arm assemblies respectively mounted to said leg tubes, each of said support arm assemblies including
   a connecting member that is movable along the respective one of said leg tubes and that is blocked by one of said restraining members disposed on the respective one of said leg tubes so as to be prevented from being separated from the respective one of said leg tubes during upward movement thereof relative to the respective one of said leg tubes, and a support arm that has a connecting section pivotally connected to said connecting member, and a free section extending from said connecting section and away from said connecting member;

wherein each of said support arm assemblies is convertible among a storage state where said support arm of said support arm assembly is substantially retracted into the respective one of said leg tubes, a projecting state where said support arm substantially projects out of the respective one of said leg tubes and where said support arm extends along an extending axis of the respective one of said leg tubes, and a display state where said support arm extends in a direction transverse to the direction of the extending axis of the respective one of said leg tubes.

2. The foldable display stand as claimed in claim 1, wherein:

each of said restraining members includes a hollow cylinder that is fixedly disposed on said top part of the respective one of said leg tubes of said leg unit; and said connecting member of each of said support arm assemblies includes a main body that is for separably engaging said hollow cylinder of the respective one of said restraining members so that said connecting member of each of said support arm assemblies is prevented from being separated from the respective one of said leg tubes during upward movement thereof relative to the respective one of said leg tubes.

3. The foldable display stand as claimed in claim 2, wherein said connecting member of each of said support arm assemblies further includes two pivot lugs that extend substantially upward from said main body of said connecting member, said pivot lugs of said connecting member of each of said support arm assemblies being pivotally connected to said connecting section of said support arm of said support arm assembly.

4. The foldable display stand as claimed in claim 2, wherein:

said connecting member of each of said support arm assemblies has two blocking surfaces that are formed at said main body of said connecting member; and said hollow cylinder of each of said restraining members has a bottom surface, said blocking surfaces of said connecting member of each of said support arm assemblies being able to be blocked by said bottom surface of said hollow cylinder of said one of said restraining members disposed on the respective one of said leg tubes so that said connecting member of each of said support arm assemblies is prevented from being separated from the respective one of said leg tubes of said leg unit during upward movement thereof relative to the respective one of said leg tubes.

5. The foldable display stand as claimed in claim 1, wherein said base has two restraining grooves, said free section of said support arm of each of said support arm assemblies extending through a respective one of said restraining grooves and extending outward of said base when said support arm assemblies are in the display state.

6. The foldable display stand as claimed in claim 5, further comprising two positioning sets, each of said positioning sets being disposed on said base and said support arm of a respective one of said support arm assemblies.

7. The foldable display stand as claimed in claim 5, further comprising a top lid that is pivotally connected to said base, said top lid being able to pivot relative to said base between an enclosed position where said top lid covers a top end of said base, and an open position where said top lid uncovers the top end of said base.

\* \* \* \* \*